United States Patent Office 3,062,850
Patented Nov. 6, 1962

3,062,850
16,24-CYCLO-21-NORCHOLENE DERIVATIVES
Monroe E. Wall, Chapel Hill, N.C., and Samuel Serota, Philadelphia, and Harold E. Kenney, Chalfont, Pa., assignors to the United States of America as represented by the Secretary of Agriculture
No Drawing. Filed May 1, 1962, Ser. No. 191,649
16 Claims. (Cl. 260—397.45)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application bearing Serial No. 97,109, filed March 20, 1961, now abandoned.

This invention relates to a novel series of steroids having a 6-membered ring fused to carbon atoms 16 and 17, and process for preparation thereof. These compounds can be regarded as derivatives of 16,24-cyclo-norcholene.

In general according to the present invention compounds of the general formula

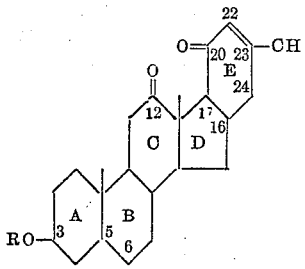

wherein the fusion of the rings A and B may be $5\alpha$, $5\beta$, or $\Delta^5$, the moiety at C–3 is $\alpha$ or $\beta$, and R is a hydrogen atom or an acyl radical derived from a lower (short carbon chain) fatty acid, are prepared by heating a 12-keto-16-dehydropregnene with acetone in the presence of a base, and, when R is an acyl radical, acylating the 3-hydroxy compound by conventional procedures.

Novel steroids of this general formula have been demonstrated to have an excitatory effect on the exocrine secretion of the pancreas. The exocrine fluids from the pancreas are a source of enzymes which aid in food digestion and also are a source of chemical means for assisting in control of acidity of the upper intestinal tract.

The reaction appears to apply generally to a 12-keto-16-dehydropregnene. Compounds used as starting materials are steroids such as $3\beta$-acetoxy-$5\alpha$,$\Delta^{16}$-pregnene-12,20-dione; $3\beta$-acetoxy-$5\beta$,$\Delta^{16}$-pregnene-12,20-dione; $3\beta$-acetoxy-$\Delta^{5,16}$-pregnadiene-12,20-dione and $3\alpha$-acetoxy-$5\beta$,$\Delta^{16}$-pregnene-12,20-dione, or corresponding compounds in which the moiety at the 3-position is a hydroxyl group or an acyloxy group obtained by esterification with a short carbon chain fatty acid.

The presence of the 12-keto group is, however, critical to the invention. Thus, the treatment of 16-dehydropregnenolone with acetone and aqueous potassium hydroxide gave unchanged 16-dehydropregnenolone.

The base may be sodium hydroxide, potassium hydroxide, barium hydroxide, sodium methoxide, potassium butoxide, and similar compounds. The preferred system is acetone and potassium hydroxide.

Heating the reaction mixture at the atmospheric pressure at about the boiling temperature of acetone, a reaction time of one to about five hours is sufficient for high yields of conversion of the 12-keto-16-dehydropregnene to the 16,24-cyclo derivative. Lower temperatures may be employed for promoting the reaction, in which case heating for longer than five hours is recommended.

Upon addition of water to the reaction mixture the 16,24-cyclo derivative crystallizes, providing a convenient means of separating this reaction product. It is obvious, however, that other means of separating this product, such as chromatography or partition in solvents can be employed for this purpose.

The preparation of compounds of the present invention is illustrated in Examples 1, 3, 4 and 5. The 3-hydroxy and 3-acyloxy products of these examples are representative of the general formula previouly described.

Example 2 demonstrates the hydrogenation of the 22,23-double bond in the new steroids, and Example 6 shows the oxidation of a 3-hydroxy-$\Delta^5$ representative of the general formula to the 3-keto-$\Delta^4$ form which is characteristic of cortisone-like steroids.

*Example 1*

Preparation of $3\beta$-acetoxy-23-methyl-$5\alpha$-16,17-cyclo-21-nor-$\Delta^{22(23)}$-cholene-12,20-dione.—Five grams of $3\beta$-acetoxy-$5\alpha$-$\Delta^{16}$-pregnene-12,20-dione, 100 ml. of acetone, and 8 g. of potassium hydroxide in 50 ml. of water were combined in a flask and heated under reflux conditions (solvent vapors condensed and returned to the flask) for about 5 hours. The mixture was diluted with 100 ml. of water and allowed to stand overnight. A crystalline product, 2.8 g., was separated from the solution and identified as $3\beta$-hydroxy - 23 - methyl-$5\alpha$-16,24-cyclo-21-nor-$\Delta^{22(23)}$-cholene-12,20-dione, M.P. 224–226° C. Upon acetylation by standard procedures, for example, heating with acetic anhydride or acetic anhydride in pyridine, followed by crystallization from methanol there was obtained 2.6 g. of the $3\beta$ acetate derivative, M.P. 247.5–248.5° C. $[\alpha]_D^{25} = +197°$ (1.5% in CHCl$_3$).

*Example 2*

Preparation of $3\beta$-acetoxy-23-methyl-$5\alpha$-16,24-cyclo-21-norcholene-12,20-dione.—The acetate derivative of Example 1 was hydrogenated in a system of 5% palladium on carbon and methanol using hydrogen gas at one atmosphere pressure for three hours at room temperature, giving $3\beta$ - acetoxy-23-methyl-$5\alpha$-16,24-cyclo-21-norcholene-12,20-dione, M.P. 228–230.5° C., $[\alpha]_D^{25} = +240°$ (1.5% in CHCl$_3$).

*Example 3*

Preparation of $3\beta$-acetoxy-23-methyl-$5\beta$-16,24-cyclo-21-nor-$\Delta^{22,23}$-cholene-12,20-dione.—Employing the same general procedure as described in Example 1, but starting with $3\beta$-acetoxy-$5\beta$-$\Delta^{16}$-pregnene-12,20-dione, the reaction gave $3\beta$-hydroxy-23-methyl-$5\beta$-16,24-cyclo-21-nor-$\Delta^{22(23)}$-cholene-12,20-dione which upon acetylation gave $3\beta$-acetoxy-23-methyl-$5\beta$-16,24-cyclo-21-nor$\Delta^{22(23)}$-cholene-12,20-dione.

*Example 4*

Preparation of $3\alpha$-acetoxy-23-methyl-$5\beta$-16,24-cyclo-21-nor-$\Delta^{22(23)}$-cholene-12,20-dione.—In a manner similar to that of Example 1, the reaction of acetone with $3\alpha$-$5\beta$-$\Delta^{16}$-pregnene-12,20-dione gave $3\alpha$-hydroxy-23-methyl-$5\beta$-16,24-cyclo-21-nor-$\Delta^{22(23)}$-cholene-12,20-dione which upon acetylation gave $3\alpha$-acetoxy-23-methyl-$5\beta$-16,24-cyclo-21-nor-$\Delta^{22(23)}$-cholene-12,20-dione.

*Example 5*

Preparation of $3\beta$-acetoxy-23-methyl-16,24-cyclo-21-nor- $^{5(6), 22(23)}$-choladiene-12,20-dione.—In a manner similar to that of Example 1, but starting with $3\beta$-acetoxy-$\Delta^{5,16}$-pregnadiene-12,20-dione the reaction with acetone in the presence of a base gave $3\beta$-hydroxy-23-methyl-16,24-cyclo - 21 - nor-$\Delta^{5(6), 22(23)}$-choladiene-12,20-dione, M.P. 264–265° C., $[\alpha]_D^{25} = +147°$ (1.6% in CHCl$_3$). Acetylation gave the 3-acetate derivative, M.P. 234–236° C., $[\alpha]_D^{25}=+104°$ (1.5% in CHCl$_3$).

*Example 6*

*Preparation of 23 - methyl - 16,24-cyclo-21-nor-$\Delta^{4(5)}$, $^{22(23)}$-choladiene-3,12,20-trione.*—A portion of the 3β-hydroxy - 23-methyl-16,24-cyclo-21-nor-$\Delta^{5,22}$-choladiene-12,20-dione product of Example 5 was oxidized with sulfuric acid-chromium trioxide mixture in cold acetone. The resultant product was isomerized by heating in acetone in the presence of p-toluene sulfonic acid to give 23-methyl-16,24-cyclo-21-nor-$\Delta^{4(5)}$, $^{22(23)}$-choladiene-3,12,20-trione, M.P. 283–285° C., $[\alpha]_D^{25}=+270°$, Σ=28,600.

We claim:

1. A compound of the general formula

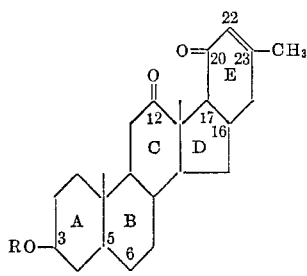

wherein the fusion of the rings A and B is selected from the group consisting of 5α, 5β, and $\Delta^{5(6)}$, R is selected from the group consisting of a hydrogen atom and an acyl radical derived from a short carbon chain saturated fatty acid, and the position of the —OR group at C–3 is selected from α and β.

2. A compound of the general formula of claim 1 in which the fusion of rings A and B is 5α, the position of the —OR group is 3β, and R is selected from the group consisting of a hydrogen atom and an acyl radical derived from a short carbon chain saturated fatty acid.

3. 3β-hydroxy-23-methyl-5α-16,24-cyclo-21-nor-$\Delta^{22(23)}$-cholene12,20-dione.

4. 3β-acetoxy-23-methyl-5α-16,24-cyclo-21-nor-$\Delta^{22(23)}$-cholene-12,20-dione.

5. A compound of the general formula of claim 1 in which the fusion of rings A and B is 5β, the position of the —OR group is selected from the group consisting of 3α and 3β, and R is selected from the group consisting of a hydrogen atom and an acyl radical derived from a short chain saturated fatty acid.

6. 3α - hydroxy-23-methyl-5β-16,24-cyclo-21-nor-$\Delta^{22(23)}$cholene-12,20-dione.

7. 3α-acetoxy-23-methyl-5β-16,24-cyclo-21-nor-$\Delta^{22(23)}$-cholene-12,20-dione.

8. 3β - hydroxy - 23-methyl-5β-16,24-cyclo-21-nor-$\Delta^{22(23)}$-cholene-12,20-dione.

9. 3β - acetoxy - 23-methyl-5β-16,24-cyclo-21-nor-$\Delta^{22(23)}$-cholene-12,20-dione.

10. 3β - acetoxy-23-methyl-5α-16,24-cyclo-21-norcholene-12,20-dione.

11. 23 - methyl-16,24-cyclo-21-nor-$\Delta^{4(5)}$, $^{22(23)}$-choladiene-3,12,20-trione.

12. A compound of the general formula of claim 1 in which the fusion of the rings A and B is $\Delta^{5(6)}$, the position of the —OR group is 3β, and R is selected from the group consisting of a hydrogen atom and an acyl radical derived from a short chain saturated fatty acid.

13. 3β - hydroxy - 23 - methyl - 16,24 - cyclo-21-nor-$\Delta^{5(6)}$, $^{22(23)}$-choladiene-12,20-dione.

14. 3β - acetoxy - 23 - methyl - 16,24 - cyclo-21-nor-$\Delta^{5(6)}$, $^{22(23)}$-choladiene-12,20-dione.

15. A process comprising heating a 12-keto-16-dehydropregnene of the general formula

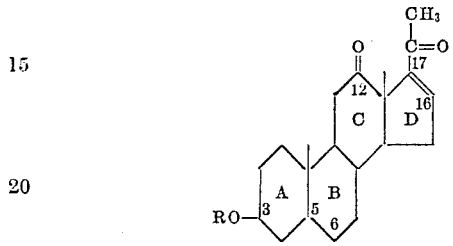

wherein the fusion of the rings A and B is selected from the group consisting of 5α, 5β, and $\Delta^{5(6)}$, the position of the —OR group at C–3 is selected from the group consisting of α and β, and R is selected from the group consisting of a hydrogen atom and an acyl radical derived from a short chain saturated fatty acid, with acetone in the presence of a base and separating from the reaction mixture a compound of the general formula

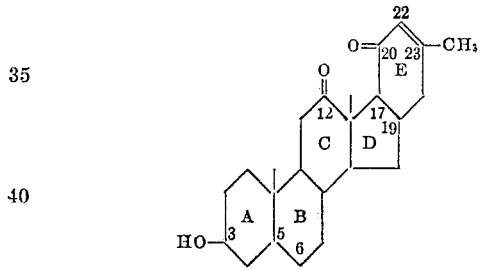

wherein the fusion of the rings A and B is selected from the group consisting of 5α, 5β, and $\Delta^{5(6)}$ and the position of the —OH group at C–3 is selected from the group consisting of α and β.

16. A process for preparing 23-methyl-16,24-cyclo-21-nor-$\Delta^{4(5)}$, $^{22(23)}$-choladiene-3,12,20-trione comprising subjecting 3β-hydroxy-23-methyl-16,24-cyclo-21-nor-$\Delta^{5(6)}$, $^{22(23)}$-choladiene-12,20-dione to the oxidizing action of a sulfuric acid-chromium trioxide mixture-in cold acetone, separating the oxidation product from the reaction mixture, heating the oxidation product in acetone in the presence of p-toluene sulfonic acid to isomerize the oxidation product and separating from the isomerization system 23-methyl-16,24-cyclo-21-nor-$\Delta^{4(5)}$, $^{22(23)}$-choladiene-3,12,20-trione.

No references cited.